(No Model.)

W. A. GALBRAITH.
TRUSS FOR VEHICLE AXLES.

No. 259,637. Patented June 13, 1882.

WITNESSES:
Fred. G. Dieterich
P. C. Dieterich

INVENTOR.
Wm. A. Galbraith
by C. A. Snow & Co.
ATTORNEYS.

UNITED STATES PATENT OFFICE.

WILLIAM A. GALBRAITH, OF FLINT, MICHIGAN, ASSIGNOR OF ONE-HALF TO JAMES GILLETT MALLERY, OF SAME PLACE.

TRUSS FOR VEHICLE-AXLES.

SPECIFICATION forming part of Letters Patent No. 259,637, dated June 13, 1882.

Application filed March 31, 1882. (No model.)

*To all whom it may concern:*

Be it known that I, WILLIAM A. GALBRAITH, of Flint, in the county of Genesee and State of Michigan, have invented certain new and useful Improvements in Trusses for Vehicle-Axles; and I do hereby declare that the following is a full, clear, and exact description of the invention, which will enable others skilled in the art to which it appertains to make and use the same, reference being had to the accompanying drawings, which form a part of this specification.

Figure 1:
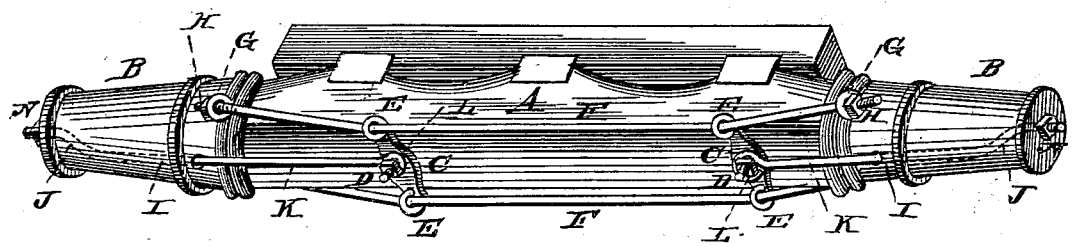
Figure 2:
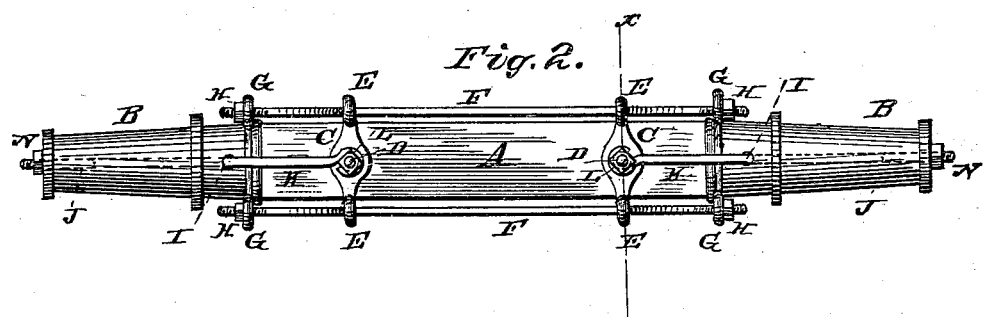
Figure 3:
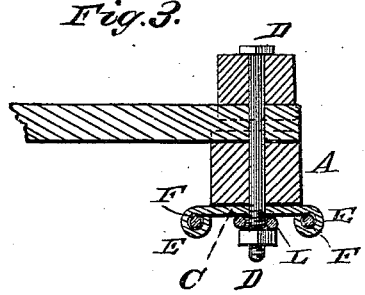

Figure 1 is a perspective view of my improved vehicle-axle. Fig. 2 is a bottom plan view; and Fig. 3 is a cross-section on the line $x$ $x$, Fig. 2.

Corresponding parts in the several figures are denoted by like letters of reference.

This invention relates to trussed vehicle-axles; and it consists in certain improvements in the construction of the same, which will be hereinafter fully described, and particularly pointed out in the claims.

Referring to the drawings hereto annexed, A represents the axle-tree, and B B the skeins.

C C are clips or fasteners secured transversely under the axle-tree, near the ends of the same, by the hound-bolts D, and provided at their ends with eyes E E to receive the truss-rods F F, which extend longitudinally under the axle-tree, closely adjoining the sides of the same.

The skeins B are provided on their sides with eyes G to receive the ends of the truss-rods F, which are bent upward at an angle sufficient to support the axle and passed through said eyes G, where they are secured by nuts H, thus serving not only to truss the axle-tree, but also to secure the skeins upon the same. The under sides of the skeins have grooves I, communicating with diagonal perforations J at their ends to receive short rods K, provided at their inner ends with eyes L, secured upon the hound-bolts D. The outer ends of the rods K pass upward through the openings J, and are secured by nuts N at the ends of the skeins, which are thereby strengthened and supported.

My improved axle-truss is simple, easily applied to vehicle-axles, and easily removed for purposes of repairs. Being a double truss, it possesses great strength and rigidity.

Having thus described my invention, I claim and desire to secure by Letters Patent of the United States—

1. The combination, with the axle A, of the skeins B, having eyes G G, the transverse clips C, secured under the axle by the hound-bolts D, and having eyes E E, and the truss-rods F F, located in the eyes E G and secured by nuts, which also serve to hold the skeins upon the axle, as set forth.

2. The combination of the axle A, the skeins B, having eyes G, grooves I, and diagonal perforations J, the hound-bolts D, clips C, having eyes E E, the truss-rods F F, rods K, having eyes L, and nuts M, all arranged substantially as set forth.

In testimony that I claim the foregoing as my own I have hereto affixed my signature in presence of two witnesses.

WILLIAM A. GALBRAITH.

Witnesses:
CHARLES LOVEJOY,
JAMES G. MALLERY.